Feb. 8, 1955 E. F. W. ALEXANDERSON 2,701,821

RECEIVER FOR COLOR TELEVISION

Filed Feb. 14, 1952 4 Sheets-Sheet 1

INVENTOR:

Ernst F. W. Alexanderson

INVENTOR:
Ernst F. W. Alexanderson

INVENTOR:
Ernst F. W. Alexanderson

INVENTOR:
Ernst F.W. Alexanderson 2,701,821

RECEIVER FOR COLOR TELEVISION

Ernst F. W. Alexanderson, Schenectady, N. Y.

Application February 14, 1952, Serial No. 271,468

3 Claims. (Cl. 178—5.4)

This invention relates to systems for reception of color television.

Several systems of color television have been proposed, but it is becoming increasingly clear that a color system, if it is to gain general acceptance must be both compatible and adaptable. The meaning of compatible is that a broadcast in color should be receivable in black and white on the standard receivers in general use.

The system should also be adaptable so that it is possible at moderate cost to adapt a standard receiver to reception of color as well as black and white.

My color receiver is intended for use with the R. C. A. system of color broadcast, which consists of a standard black and white transmission with color signals superimposed.

One object of my invention is to provide means for adapting the standard receiver to reception of color without impairing its usefulness for receiving black and white programs.

Another object is to project a color picture on a screen in a theatre or a home. For this purpose a standard television projector of white light is used. The color is introduced by red, green and blue lines on the reflecting screen.

The idea of using a picture tube with a coating of color phosphor lines is old. Reference may be made to Ruedenberg U. S. Patent 1,934,821, November 1933, and M. Von Ardenne British Patent 388,623, May 2, 1933. Various methods have been proposed for directing the electron beam so as to produce the desired color. The novelty of my invention is in the method by which the color selection is accomplished.

The method for color selection which the early inventors had in mind consisted in establishing a geometric identity between the line pattern on the screen and the scanning raster. This involves great difficulties, both in manufacture and in operation. One of my objects is to make the control of the scanning raster independent of the line pattern, so that the standard scanning system for black and white pictures can be retained when the receiver is adapted for color by substituting a color tube.

In the standard 525 line picture alternate lines are covered by one field and the lines in the next field are interlaced. I propose to use a triplet of color lines for each line in one field. Thus the total number of color lines is 50 per cent greater than the total number of scanning lines.

Figure 1:
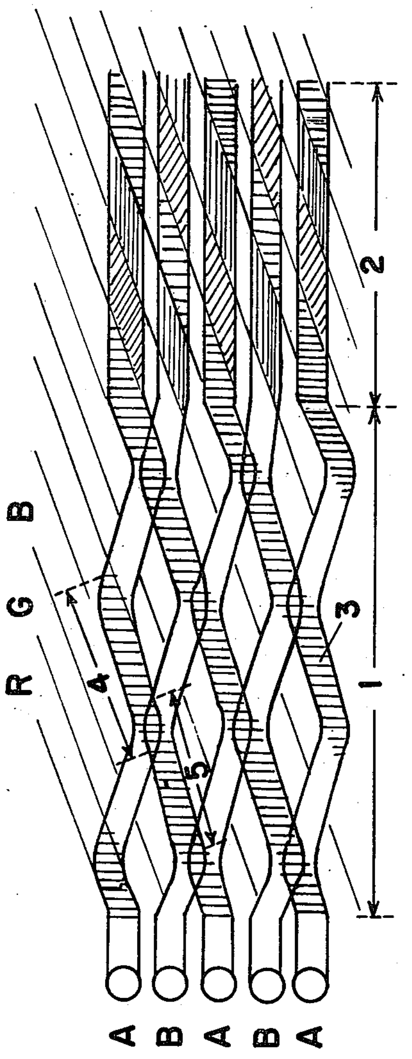

The scanning lines are oriented relative to the color lines at an angle of 20 degrees. For tracing the white portions of the picture the spot travels in straight lines. If, however, the color red is wanted, the path of the spot is changed into a wave line, as shown in Fig. 1. The frequency of the wave is about two megacycles. The scanning lines of alternate fields are marked with the letters "A" and "B." The color lines are marked R. G. B. The left portion of the illustration represents a red area 1 and the right portion a white area 2. It can be seen that alternate inflection points of the wave lines are the points 3, where the straight scanning line would intercept the red lines. The phase of the wave is adjusted accordingly. It can also be seen that the waves of scanning lines belonging to alternate fields are 180 degrees out of phase. The result is that the scanning lines of field "A" covers the red lines intermittently in dashes 4, leaving equal intervals unexposed. The scanning lines of the "B" field, however, fills in the spaces 5 left blank by the "A" field, so that the whole length of the red line is illuminated, as shown by the cross shading of the illustrations. The right side of the diagram, where the scanning spot travels the straight lines, shows small interlaced exposures of red, green and blue, which at normal viewing distance give the impression of white light.

The area covered by the wave line is predominantly red, even if the electron beam is kept at full intensity continuously. A purer color is, however, produced if the electron beam is suppressed when it crosses green and blue.

Figure 2:
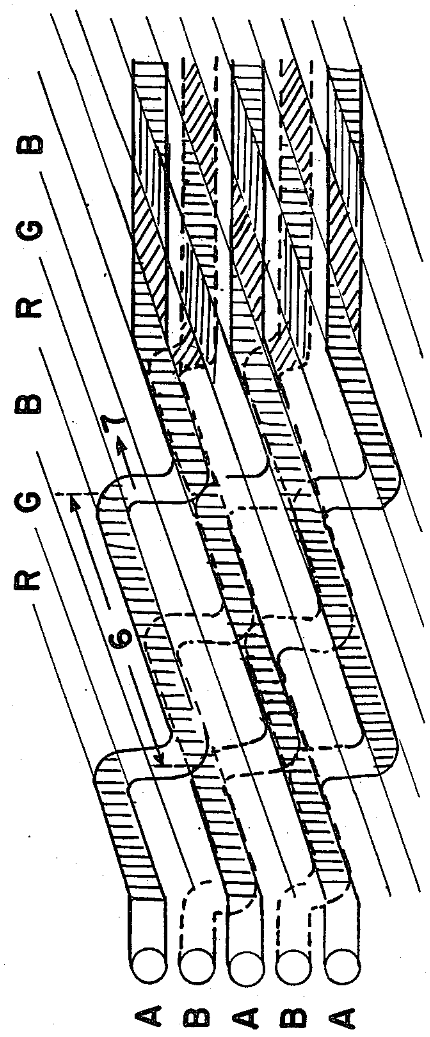

Another way of using the wave line control is shown in Fig. 2. The wave shape of the wave line is changed by introducing even harmonics in the control circuit, so as to create a saw tooth wave. The scanning spot follows the red line in a long stroke 6 and then changes over abruptly to the next red line. It can be seen that the whole red line is covered without unexposed intervals. Therefore, when field "B" is added the result is that the red line is covered twice and the brilliancy is twice as great. With this method of color selection it is not necessary to modulate the electron beam by the color signal. The control of the electron beam by the basic black and white video signal is left intact.

The practical problem is: How can the wave line be produced reliably?

There are two possible approaches to the problem, both of which may be successful. The first may be called instantaneous control and the second memory control.

An analysis of instantaneous control will lead to an easier understanding of memory control.

A red and a green and a blue photoelectric cell pick up the light from the screen. If white light is called for, each of these photoelectric cells picks up pulses of its corresponding color. Each pulse signal is amplified and the three are combined into a three phase A.-C. network of two megacycles frequency. The output of this network passes through electronic gates which are controlled by the color signal. When the signal calls for white, all the gates are open. The combined output of the three gates is the vectorial sum of the three phases. This vectorial sum is zero. Therefore no signal reaches the wave line circuit and the scanning spot traces a straight line and produces white light.

If, on the other hand, the received signal calls for red, the following takes place. The gate is open for red, but the gates for green and blue are closed. A sine wave voltage is then admitted to the composite circuit and the voltage has a phase which expresses the timing of the interception between the scanning spot and the red lines. This voltage is applied to the vertical deflection electrodes of the electron beam, thus causing the scanning spot to trace a wave line. The three phase transformer can then be so adjusted that the wave line pattern coincides with the red lines of the screen.

With this understanding of the functioning of the three photoelectric cells, the memory control can be explained. The red and blue photoelectric cells are left out and it is assumed that in the sweep of a whole line there is enough green light picked up to keep the control functioning, provided that it is endowed with a memory or flywheel effect. In electrical terms, the equivalent is a tuned regenerative circuit which is kept in oscillation by absorbing the impulse from the green photoelectric cell. The single-phase flywheel circuit is then transformed into a three phase network where the three terminals represent the proper phase relationship of red, green and blue. From this point on the control is the same as if three photoelectric cells had been used.

Figure 3:
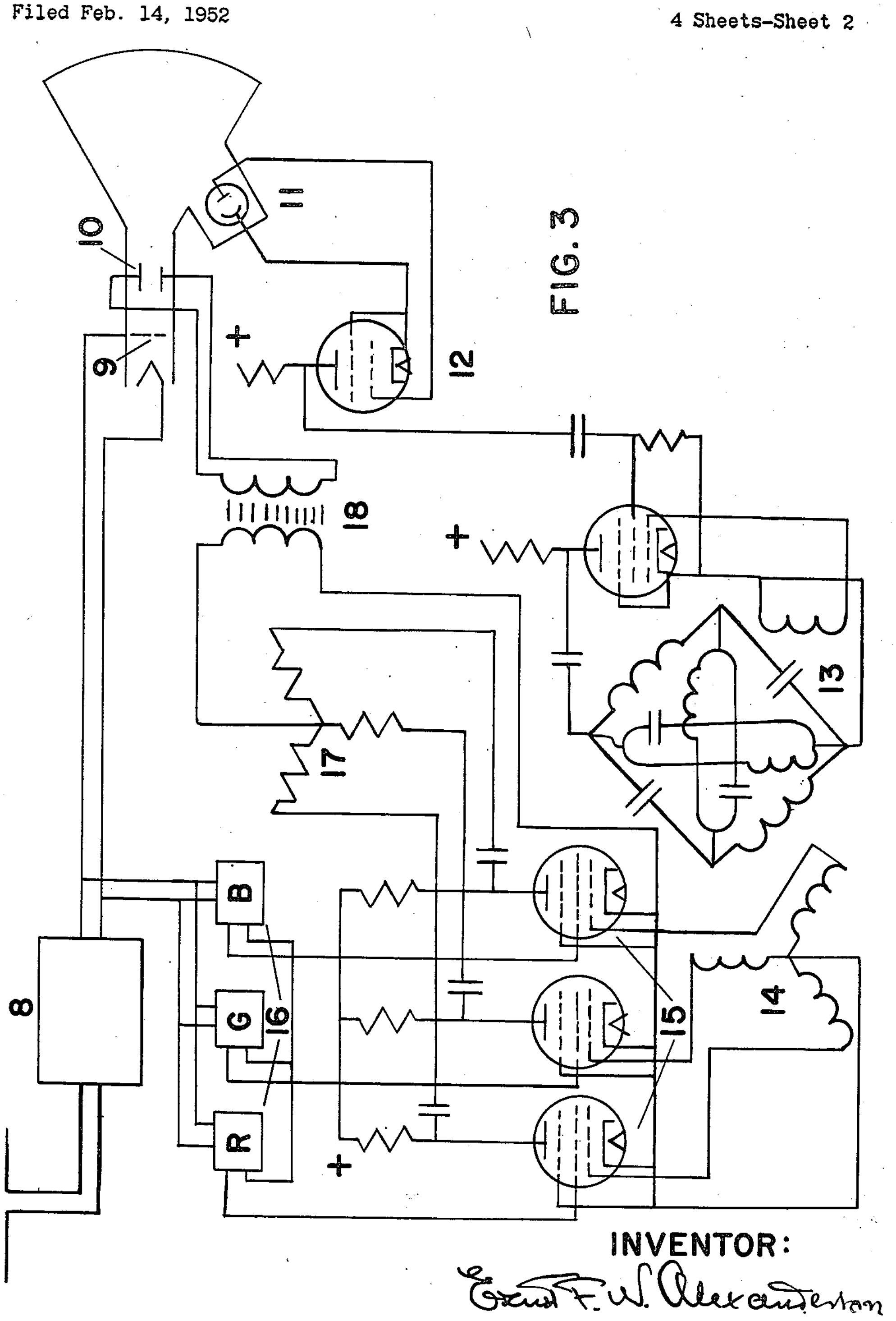

Fig. 3 shows the diagram of a color receiver adapted from a standard black and white receiver. The original receiver is shown as a box diagram of an amplifier 8 controlling the grid of the electron gun 9. All reference to the scanning system is left out, because it is not changed. The picture tube with color lines is made like a standard tube, except that it has an additional pair of electrostatic electrodes 10 capable of giving a slight vertical deflection. The wave in the scanning line is introduced through these electrodes. The tube has also an inset for a photoelectric cell 11 exposed to the light of the screen.

The functioning of the color control is illustrated in its simplest form; a single photoelectric cell, a memory circuit and color selection by the wave line. A supplementary color control may be introduced through the grid of the electron gun, as shown on Fig. 4.

Figure 5:
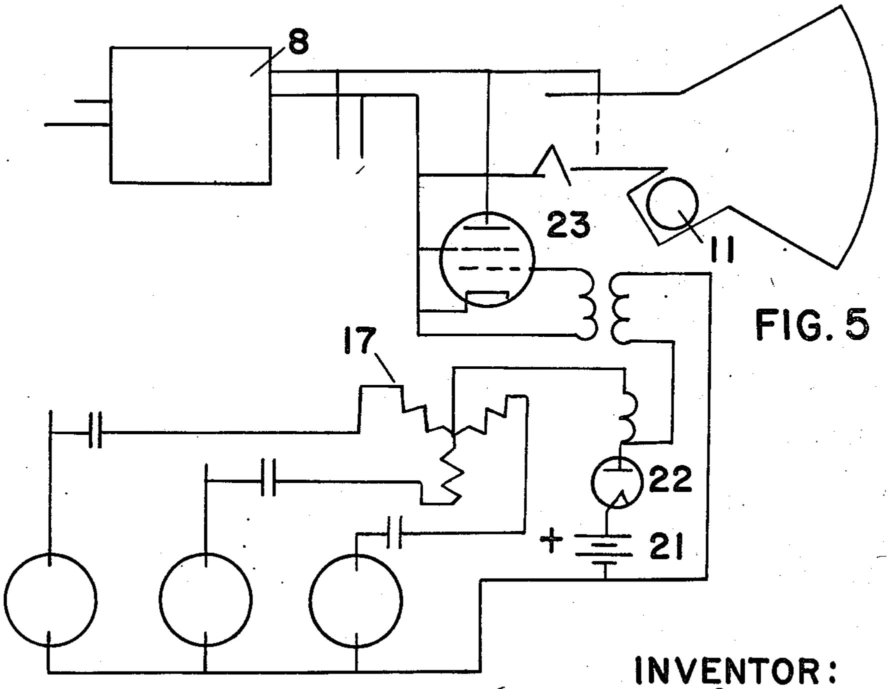

It is also possible to control the color selection entirely by the electron gun leaving out the control of the wave line, Fig. 5.

The functioning of the elements of the system can be best described by following the sequence of cause and effect.

Referring to Fig. 3, it may be assumed that the photoelectric cell is disconnected. The picture tube is then translating the basic video signal into a normal black and white picture. The straight scanning lines are successively intercepting the red, green and blue lines of the screen and the photoelectric cell is exposed to pulses of green light. Now, it may be assumed that the photoelectric cell is connected to the amplifier 12. A signal of two megacycles is then generated which starts the tuned oscillator 13 and energizes the 3-phase network 14. A.-C. voltages are thus generated of proper phase to represent red, green and blue. These voltages are applied to control grids of three pentodes 15, which serve as color gates. The other control grids of these tubes are controlled by the three detectors 16 which separate the color signals and open the gates. The three A.-C. signals which pass through the gates are combined in an impedance network 17 so as to give an output signal which represents the vectorial sum. This signal is passed through a wave shape transformer 18 which generates a saw tooth wave. The wave shape transformer is shown as an iron core transformer with D.-C. saturation. It should be understood, however, that there are other ways by electronic means and otherwise to produce the desired wave shape.

Phase displacements occur in the several parts of the circuit which begins with the photoelectric cell and ends with the wave line that selects the color. The wave line for green should be 90 electrical degrees out-of-phase with the green pulses picked up by the photoelectric cell. The ultimate adjustment of phase must be made in operation, so as to get the greatest purity of color. This adjustment may be made by the three-phase transformer 13 which is assumed to have a secondary which can be moved angularly relatively to the primary. This means that the primary is assembled so that it creates a rotating magnetic field and the secondary 14 is centered in that field.

Figure 4:
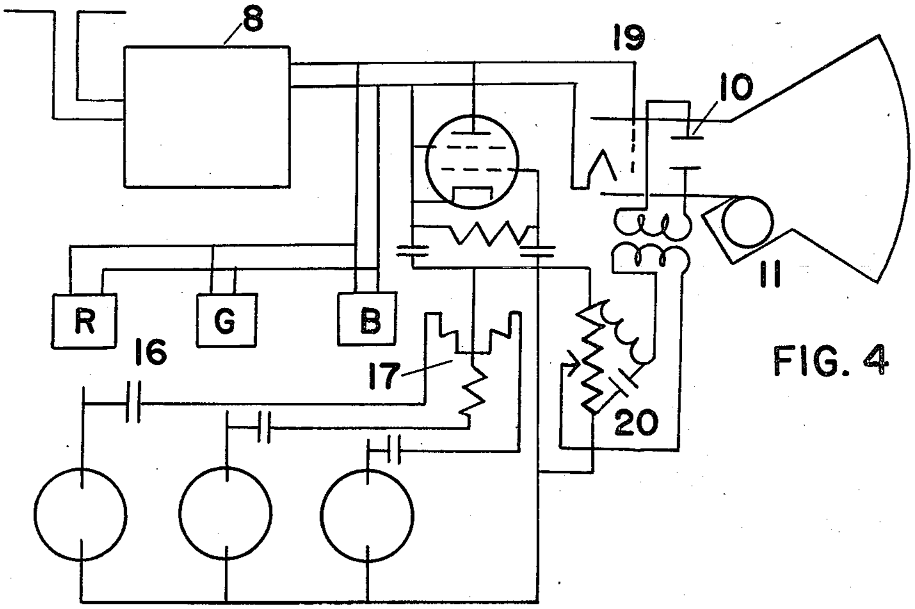

Fig. 4 shows a color control in which the color selection by wave line is supplemented by control of the grid of the electron gun 19. The wave shape transformer is left out because this dual control gives a nearly complete suppression of the undesired colors if a sine wave voltage is impressed on both control electrodes. One of the branches of the control circuit includes a phase shifter 20, in order to establish the 90 degrees phase relationship between the wave line and the modulation of the electron beam.

Fig. 5 shows another form in which the control of color selection is introduced through modulation of the electron beam only. A square wave control voltage is used which suppresses the electron beam two-thirds of the time when it passes over the undesired colors. The control signal is transformed into an unsymmetrical square wave by electronic means, as indicated by the diagram.

It should be observed that the frequency of the wave line is a function of the angle between the scanning lines and the color lines. The angle and the corresponding frequency may be chosen with considerable latitude, but when this choice has been made, it is necessary to adjust the angle so that the wave frequency is an odd harmonic of the horizontal sweep frequency. The waves on successive scanning lines of field "A" will then be in phase with each other, as shown on Fig. 1. But, the wave frequency must not be rigidly tied to the phase of the sweep frequency. That would impose too rigid requirements of accuracy, which this invention is intended to avoid. In fact, a slight departure from a strictly harmonic frequency is desirable. Thus the scanning wave should preferably drift half a wave length in tracing field "A," so that it can start correctly on the reversed phase of field "B," as shown in Fig. 1. This is, however, not a rigid requirement, because the photoelectric cell signals the interception of the color lines and controls the phase of the wave line. Therefore, if field "B" should start with the wrong phase, it will require only the tracing of a line or two before the fault is automatically corrected. After the new phase has been established, however, the successive lines should pick up the phase in synchronism with the previous lines. This requires means for adjusting the angle between the scanning lines and the color lines, but this adjustment does not require any excessive accuracy. Such adjustment may be made in the manufacture and may consist in turning the picture tube slightly relatively to the scanning control.

Figure 6:
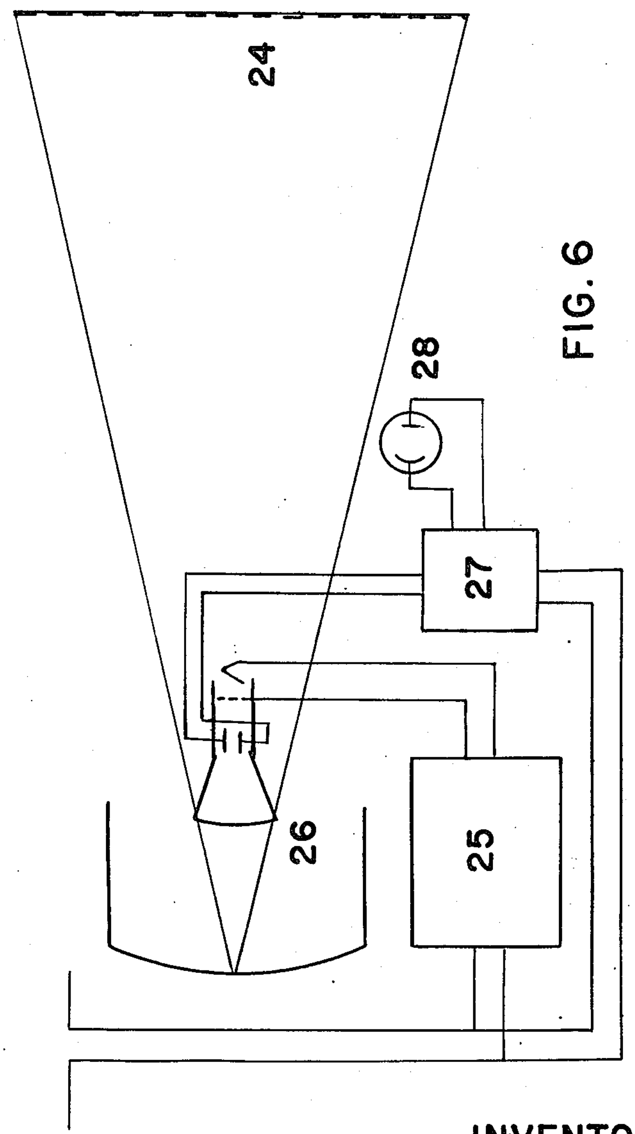

Fig. 6 shows a black and white television protector adapted for reception of color. The picture screen 24 has red, green and blue lines. The box diagram 25 represents the standard control and 26 represents a picture tube for white light with an optical reflection projector. The color control 27 is a separate equipment which can be added or detached. It receives the color signal from the antenna and comprises a photoelectric cell 28 which is exposed to the light from the screen. The composite signal changes the scanning line into a wave line.

A reflecting screen is illustrated but a transparent screen may be used.

The color screen may be used for reception of black and white pictures with or without the color control. The color control may be adjusted so as to make black and white pictures more interesting. Thus the highlights may be made yellowish, like sunlight, while the shadows are made dark blue.

Such effects can be achieved by keeping the blue color gate partly open and making the red and green gates responsive to signal intensity. Other color combinations are possible, depending upon the subject.

Although, in accordance with the provisions of the patent statutes, I have described this invention as embodied in concrete form, I would have it understood that the apparatus and connections shown in the several figures of the drawing, and described in the specifications, are merely illustrative and the invention is not limited thereto, since alterations and modifications will readily suggest themselves to persons skilled in the art without departing from the true spirit or from the scope of the annexed claims.

What I claim as new and desire to secure by Letters Patent is:

1. A television receiver comprising a picture surface with red, green and blue lines oriented at an acute angle relatively to the scanning lines, means for scanning the picture surface with a light spot, three color detectors, one for each color produced by the light spot, means for amplifying the color signals, a three phase oscillator regeneratively locked in synchronism with the color signal, means for deriving a three phase saw-tooth wave from the regenerative oscillator, means for selecting one phase of the three phase saw-toothed wave in response to the desired color and means for deflecting the light spot vertically in response to the saw-toothed wave so that it travels along lines of the same color most of the time and transfers quickly from one line to the next line of the same color, thereby tracing a wavy path on the picture surface.

2. A television receiver, comprising a picture surface with red, green and blue lines, oriented at an acute angle relatively to the scanning lines, means for scanning the picture surface with a spot of light, detector means for one of the three colors, a feedback signal responsive to the color detector, a polyphase regenerative oscillator locked in synchronism with the color detector, means for deriving a three phase saw-tooth wave from the regenerative oscillator, means for selecting one phase of the saw-tooth wave in response to the desired color and means for deflecting the light spot vertically in response to the saw-tooth wave so that it travels along lines of the desired color most of the time and transfers quickly from one line to the next line of the same color thereby tracing a wavy line on the picture surface.

3. A television receiver comprising a picture surface with red, green and blue lines, oriented at an acute angle relatively to the scanning lines, means for scanning the picture surface with a light spot, detector means for the color of the light spot, a feed-back signal responsive to the color of the light spot, a polyphase regenerative oscillator locked in synchronism with the color detector, a three phase output signal from the regenerative oscillator, means for selecting one phase of the output signal corresponding to the desired color, means for deflecting the light spot vertically in response to the selected signal wave so that it travels along lines of the same color substantially one half of the time, and means for suppressing the light spot during the intervals when it transfers from one line to the next line of the same color.

References Cited in the file of this patent

UNITED STATES PATENTS

| | | |
|---|---|---|
| 2,415,059 | Zworykin | Jan. 28, 1947 |
| 2,431,115 | Goldsmith | Nov. 18, 1947 |
| 2,545,325 | Weimer | Mar. 13, 1951 |
| 2,587,074 | Sziklai | Feb. 26, 1952 |
| 2,650,264 | Weimer | Aug. 25, 1953 |